May 9, 1967  L. R. CHREIST, JR  3,318,615
SIDE MOUNTED ACCESSORY FOR TOY VEHICLE
Filed Aug. 4, 1965  4 Sheets-Sheet 1
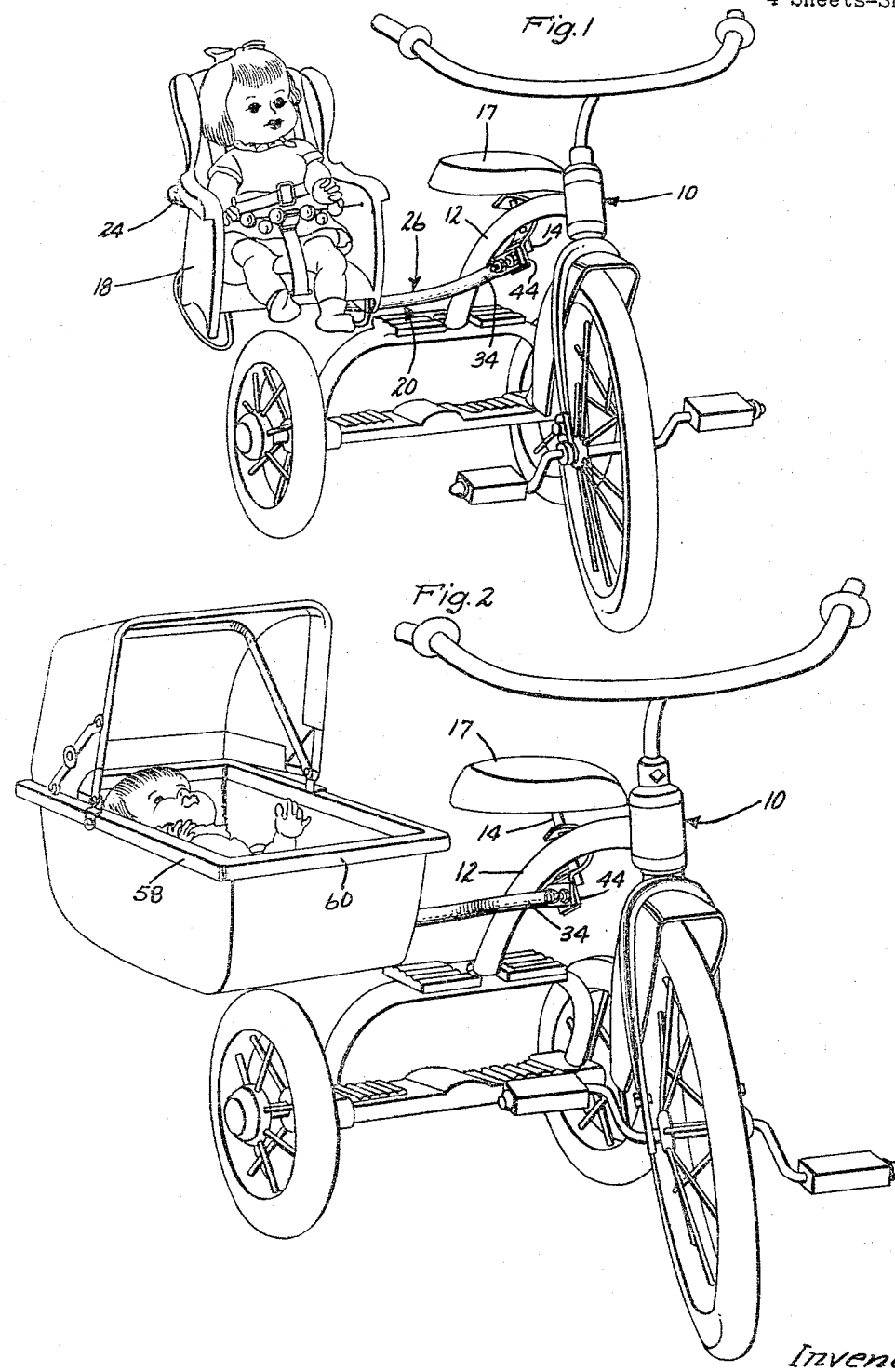
Inventor:
Louis R. Chreist, Jr.
by Hood, Gust & Irish
Attorneys.

May 9, 1967 L. R. CHREIST, JR 3,318,615
SIDE MOUNTED ACCESSORY FOR TOY VEHICLE
Filed Aug. 4, 1965 4 Sheets-Sheet 2

Inventor:
Louis R. Chreist, Jr.
by Wood, Just & Drish
Attorneys.

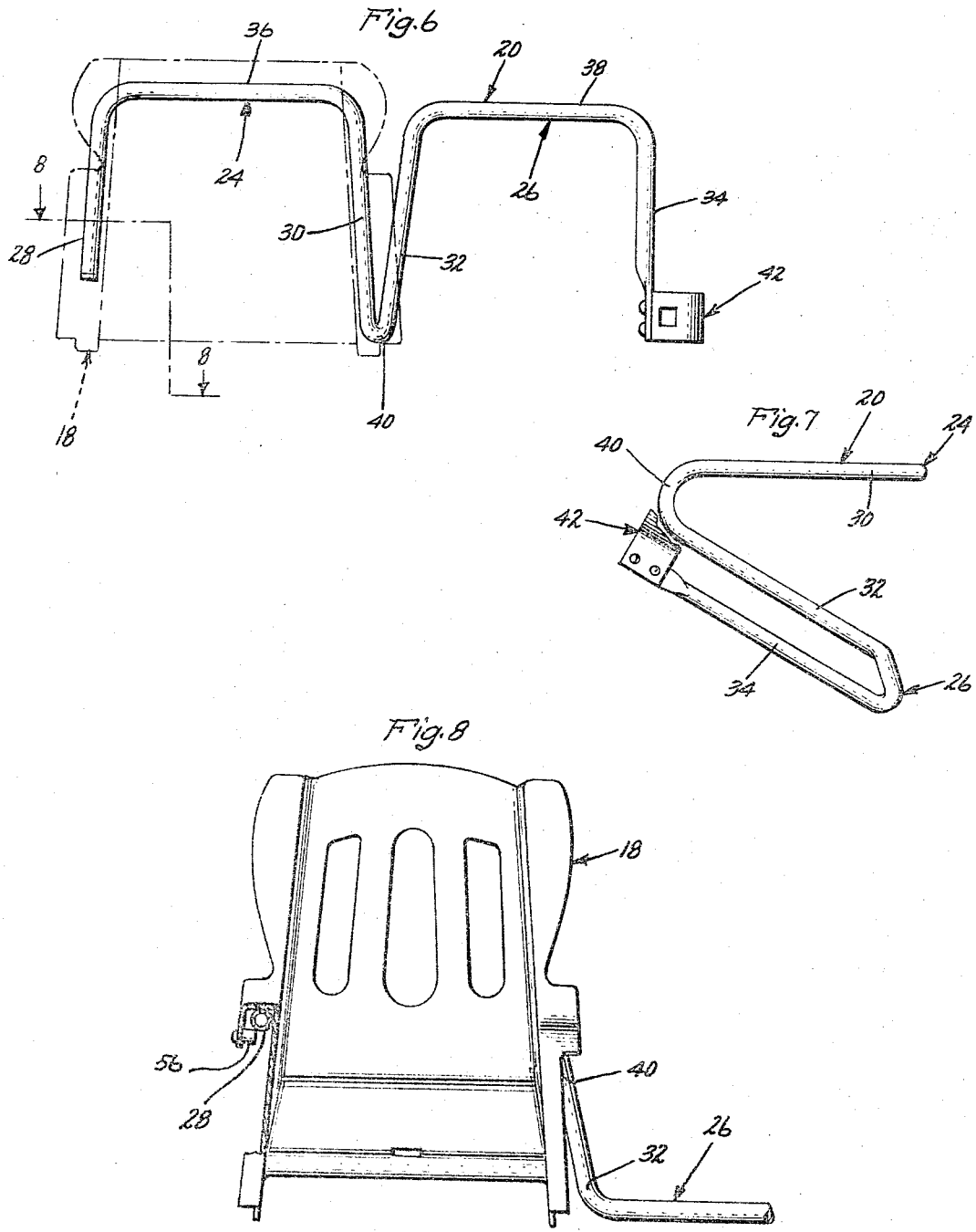

May 9, 1967  L. R. CHREIST, JR  3,318,615
SIDE MOUNTED ACCESSORY FOR TOY VEHICLE
Filed Aug. 4, 1965  4 Sheets-Sheet 4
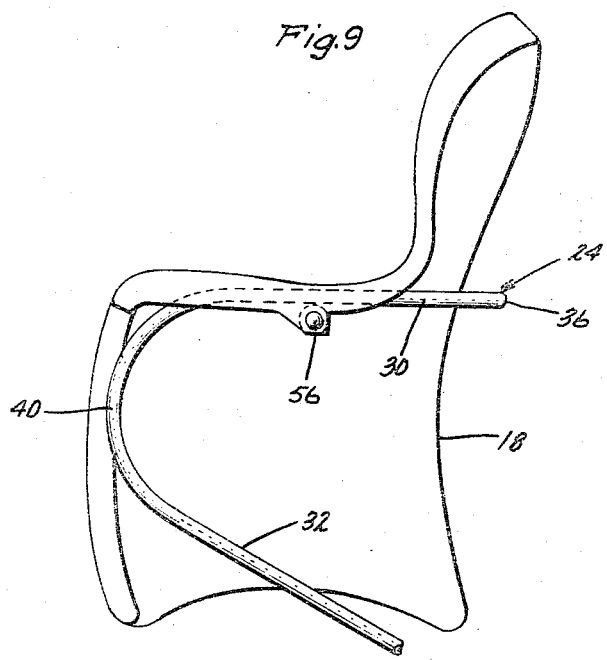
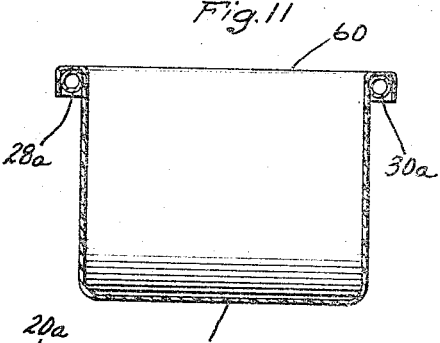
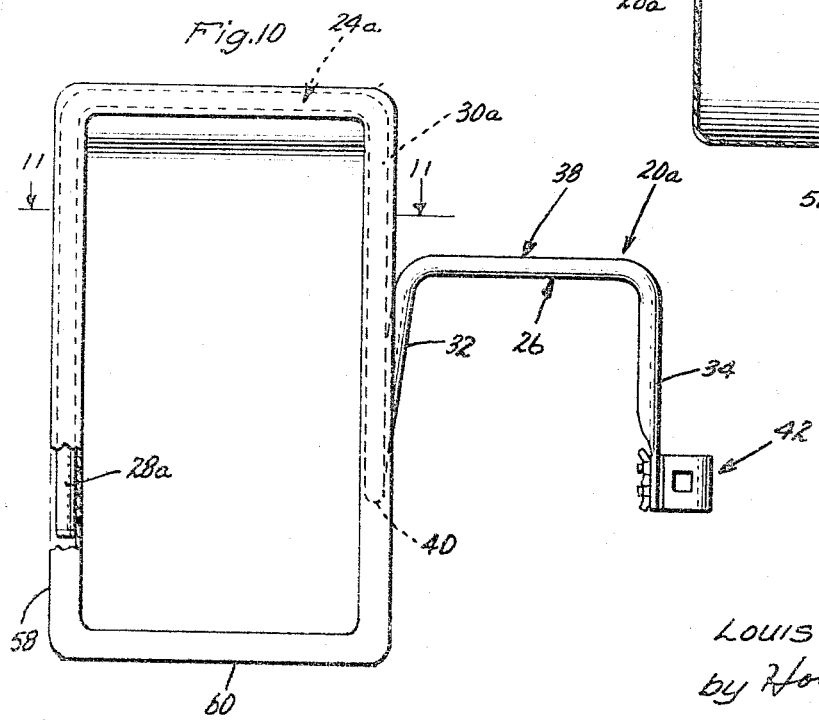
Inventor:
Louis R. Chreist, Jr.
by Hood, Gust & Irish
Attorneys.

United States Patent Office 3,318,615
Patented May 9, 1967

3,318,615
SIDE MOUNTED ACCESSORY FOR TOY VEHICLE
Louis R. Chreist, Jr., South Bend, Ind., assignor to South Bend Toy Manufacturing Company, Inc., South Bend, Ind., a corporation of Indiana
Filed Aug. 4, 1965, Ser. No. 477,224
12 Claims. (Cl. 280—289)

The present invention relates to a side mounted accessory for toy vehicles, and more particularly to a sidecar type of accessory for tricycles.

Sidecar attachments for two and three wheel vehicles customarily are partially supported by a third or fourth wheel which is not needed for supporting the vehicle itself. Such wheel is usually mounted to one side of the sidecar with an axle or frame extending between this wheel and the vehicle itself. The sidecar is in some fashion mounted between the accessory wheel and the vehicle and is supported directly on the axle or frame.

It is an object of this invention to provide a side accessory for a vehicle which does not require an additional wheel for supporting the same.

It is another object of this invention to provide a convenient method of mounting a side accessory from the seat post structure of an ordinary tricycle or bicycle.

It is yet another object of this invention to provide a side mounting device for a vehicle which may be secured detachably thereto in a simple, reliable and facile manner.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a perspective illustration of one embodiment of this invention;

FIG. 2 is a perspective illustration of a slightly different embodiment of this invention;

FIG. 6 is a top plan view of the cantilever frame of the arrangement shown in FIG. 1;

FIG. 7 is an end view of the frame of FIG. 6;

FIG. 8 is a fragmentary and partially sectioned view of the chair of FIG. 1 showing its attachment to the support of FIGS. 6 and 7;

FIG. 9 is a side view of the arrangement of FIG. 8;

FIG. 10 is a top plan view, partially broken away for clarity of illustration, of the cab and mounting bar device of FIG. 2; and FIG. 11 is a cross-section taken substantially along section line 11—11 of FIG. 10.

Figure 4:
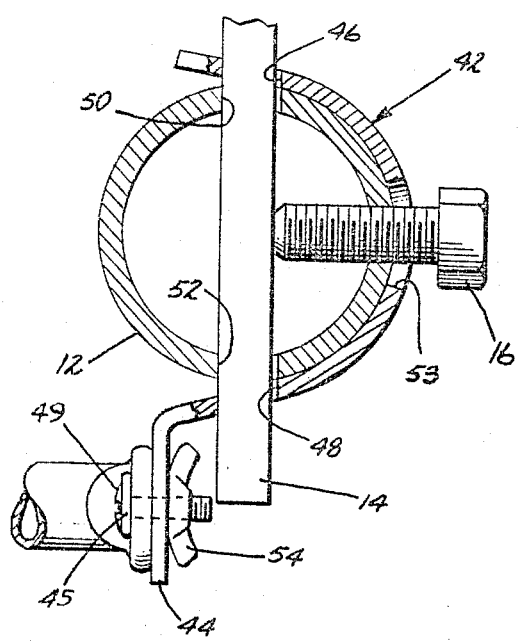
FIG. 4 is an enlarged, fragmentary cross-sectional view of the mounting bracket portion of the arrangements of FIGS. 1 and 2.

Referring to the drawings, and more particularly to FIGS. 1 and 2, a conventional tricycle 10 is provided with a bar-like frame 12 which receives through two companion, diametrically opposite holes 50 and 52 a seat post 14 which is secured in place by means of a locking screw 16 (see FIG. 4). As shown in FIG. 4, the screw 16 is threaded through the frame 12 and engages at the inner end thereof the post 14. The latter is thereby secured in place. A seat 17 is mounted on the upper end of the post 14 in a conventional manner.

Referring now to FIG. 1, a doll chair 18 of the style and design disclosed in Chreist Patent No. 3,155,425 is supported to one side of the tricycle 10 by means of a cantilever frame or support 20. This support 20 is more clearly shown in FIGS. 6 through 9 and comprises essentially a bar or tubular element bent to the configuration shown. In general, this configuration comprises first and second U-shaped sections 24 and 26, respectively, these sections having side arms 28, 30 and 32, 34, respectively, as shown. Also, section 24 has a crossbar 36 and section 26 has a similar crossbar 38. The two U-shaped sections 24 and 26 are positioned side-by-side (FIG. 6) and open in the same direction. As more clearly shown in FIG. 7, when the U-shaped section 24 is positioned horizontally, the other section 26 is inclined downwardly and toward the right. The ends of the adjacent arms 30 and 32 are connected together by a curved portion or section 40 as shown, this curved portion in combination with the two arms 30 and 32 generally defining an upright plane which angles downwardly and away from the section 24 (see FIGS. 6 and 8). This is more clearly shown in FIG. 6, wherein the section 26 is spaced slightly away from the section 24. The reason for this will become apparent from the description that follows.

Figure 3:
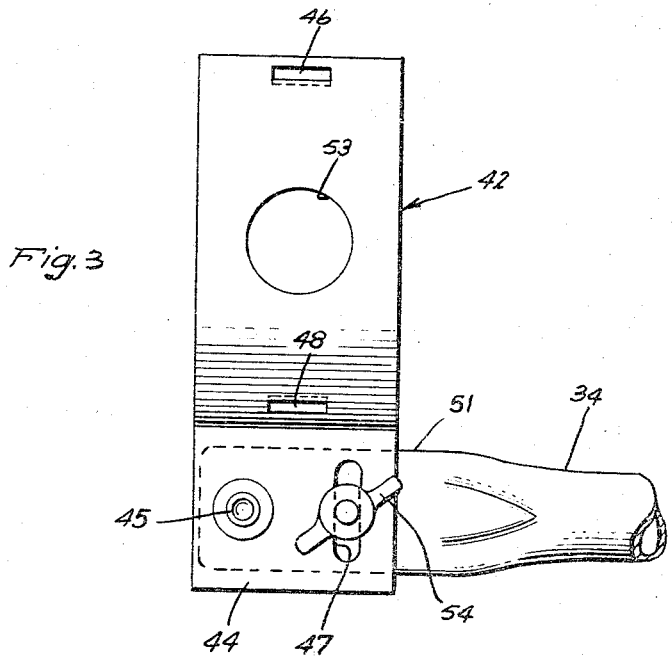
FIG. 3 is an enlarged, fragmentary illustration in elevation of the mounting bracket portion of the embodiments of FIGS. 1 and 2.
Figure 5:
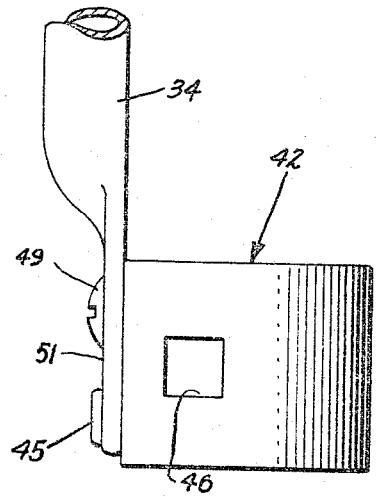
FIG. 5 is another enlarged, fragmentary illustration of the top of the mounting bracket of FIGS. 3 and 4.

On the free end of the arm 34 of the section 26 is a mounting bracket shown enlarged in FIGS. 3, 4 and 5. As shown, this mounting bracket, generally indicated by the numeral 42, is generally semi-cylindrical in shape and preferably is fabricated of rigid and relatively strong strap steel. One end of the semi-cylindrical portion is flared diametrically outwardly to provide a flat mounting lug 44, this lug 44 extending in a direction substantially parallel to a diameter of the semi-cylindrical portion as well as of the bar-like frame 12 (see FIG. 4).

Diametrically opposite portions of the semi-cylindrical portion are provided with two holes, respectively, indicated by the numerals 46 and 48. These holes are spaced apart in a direction substantially parallel to the plane defined by the lug 44 and furthermore align with the companion openings 50 and 52 in the bar-like frame 12 which receives the seat post 14. The seat post 14 passes through both sets of openings, 46, 50 on the one hand and 48, 52 on the other hand. The particular shape of the bracket 42, the sizes of the openings and the like may be made such as to provide a friction fit with the post 14, thereby securing firmly the bracket 42 in place when the screw 16 is tightened against post 14.

The bracket 42 is also provided with an enlarged opening 53 for receiving the shank of the screw 16 therethrough as shown.

The free end of arm 34 is flattened as shown more clearly in FIGS. 4 and 5 and pivotally secured to the lug 44 by means of a rivet or pivot pin 45. Spaced to one side of the pivot pin 45 and provided in the lug 44 is an arcuate slot 47 having a circular curvature which centers about the pivot pin 45. A bolt 49 passes through the flattened end 51 of the arm 34 and also through the slot 47 to receive thereon a conventional wing nut 54. Loosening the wing nut 54 permits limited pivotal adjustment of the bracket 42 with respect to the arm 34. Tightening the wing nut 54 results in locking the bracket 42 in adjusted position on the arm 34.

As shown in FIG. 1, when the bracket 42 is mounted on the bar 12 as shown, the lug 44 depends downwardly and the arm 34 extends rearwardly and downwardly. On the other hand, the arms 28 and 30 of the U-shaped section 24 are substantially horizontal. Achieving this horizontal position is made possible by the pivotal adjustment just described of the arm 34 relative to the bracket 42.

Again as shown in FIG. 1, the two U-sections 24 and 26 of the cantilever support 20 open forwardly of the tricycle. The reason for this will become apparent from the description that follows. The chair 18 shown in FIG. 1 is indicated in dashed lines in FIG. 6 and in full lines in FIGS. 8 and 9. As shown more clearly in FIGS. 8 and 9, the armrests of this chair each are of inverted U-shape in cross-section and fit over the arms 28 and 30 of the U-section 24 for supporting the chair 18 on the cantilever support 20. A boss or stud 56 is secured to a portion of the armrest flange as shown in FIGS. 8 and 9 so as to partially engage the underside of the arms 28 and 30, the size of the studs 56 being such that they provide interference to the lifting of the chair 18 from the arms 28 and 30 but on the other hand resist dislodgement of the chair. In order to mount the chair 18 onto the supporting section 24, the chair is merely fitted in between the arms 28 and 30 and the armrests of the chair are snapped down over the two arms 28 and 30. The chair may be removed either by sliding it forwardly from the opening of the U-section 24 or lifting it upwardly, forcing the studs 56 over the arms 28 and 30.

The other embodiment of this invention is shown in FIGS. 2, 10 and 11 wherein like numerals indicate like parts. The U-shaped section 26 of the cantilever support may be identical to the section 26 previously described. However, the other U-shaped section indicated generally by the numeral 24a is somewhat larger than section 24 and is provided with side arms 28a and 30a which are longer than the arms 28 and 30 of the preceding embodiment of FIGS. 6 through 8. A doll cab 58, preferably made of a suitable plastic material, is provided with a perimetral flange 60, which, in cross-section, is of inverted U-shape. The size and shape of this flange 60 correspond precisely to the size and spacing of the arms 28a and 30a of the U-section 24a such that the latter fits into the flange 60 as shown more clearly in FIGS. 10 and 11. By this means, the cab 58 is fully, removably supported in position on the cantilever mount 20a. When it is desired to remove the cab 58 from the U-section 24a, it is merely necessary to lift the cab from the arms 28a and 30a. As shown more clearly in FIG. 10, the shape of the cab 58 is essentially rectangular such that it is necessary for the arms 28a and 30a to be longer than one-half of the length of the cab 58 to prevent the latter from tipping while mounted on the U-section 24a.

Of importance to this invention is the fact that the bracket 42 provides a facile method of attaching rigidly the cantilever support 20 to the tricycle 10. Also, it provides a means for leveling the chair 18 once the bracket 42 has been installed on the seat post 14, this leveling being facilitated by loosening the wing nut 54 and pivoting the bracket 42 until a level position is obtained.

Of further importance is the fact that the U-shaped section 26 of the cantilever support has the crossbar 38 thereof positioned rearwardly and downwardly of the tricycle seat 17. Also, the arms 32 and 34 are separated a distance to provide a space for a child's legs while he is pedaling the tricycle. Thus, the tricycle may be safely and conveniently operated in the usual manner without interference from the side-accessory mounting.

Should it be desired to remove the side-accessory, all that is required is the withdrawal of the seat post 14 from the tricycle frame 12. The bracket 42 may thereby be dismantled from the frame 12.

The rivet 45 in another form of the invention may be replaced by a bolt and nut like the assembly 49, 54. This permits easy disassembly of the arm 34 from the bracket 42 by simply removing both nut and bolt assemblies. Thus, the side accesory may be conveniently detached from the tricycle without having to first remove the seat.

Since by far the majority of bicycles and tricycles use seat posts corresponding to post 14 and bar-like frames corresponding to frame 12, it is obvious that the particular bracket 42 is of versatile application and will fit the various sizes and designs of tricycles and bicycles which are commercially available.

While there have been described above the principles of this invention in connection with specific apparatus, it is to be clearly understood that this description is made only by way of example and not as a limitation to the scope of the invention.

What is claimed is:

1. In combination with a tricycle having a bar-like frame upon which a seat is mounted, said frame extending between the front and rear ends of said tricycle, the mounting for said seat including a post which passes through companion openings in said frame and a set screw threaded into said frame and locking said post against movement; a vehicular accessory comprising a bar-like support having first and second U-shaped sections, each section having two arms and a cross-bar, said sections being disposed in side-by-side relation and opening in the same direction, a curved section connecting the ends of adjacent arms of said first and second sections, said second section being disposed at a lower level than said first section when the latter is horizontally aligned, said curved section generally defining a substantially upright plane inclined downwardly and away from said first section when the latter is horizontally aligned, a mounting bracket attached to the free end of said second section, said bracket having a semicircular portion and a diametrically outwardly extending mounting lug on one end of the semi-circular portion, said lug being flat and pivotally connected to said free end, a locking screw projecting through companion openings in both said free end and said lug for securing said bracket in adjusted position, at least one of the last-mentioned openings having a clearance with said screw for permitting pivoting adjustment of said bracket relative to said second section, said bracket extending in a direction transverse to the arm carrying said free end, said semi-circular portion having two holes which are spaced apart in a direction parallel to said lug, said semi-circular portion partially surrounding the frame of said tricycle, and said post passing through said two holes as well as the companion openings, thereby mounting said bracket and said bar-like support on said frame, said lug depending from said frame and said bar-like support extending laterally therefrom in the form of a cantilever, said first section generally defining a plane which is horizontal and said second section generally defining an inclined plane wherein the cross-bar thereof is lowermost and rearward on the tricycle from said bracket, said first section being laterally spaced from said tricycle seat post a predetermined distance to accommodate without interference the leg of a rider on the tricycle.

2. The combination of claim 1 including a body-supporting device fitted into and suspended from said first section, said body-supporting device including two flange portions resting on and fitting over the arms, respectively, of said first section.

3. The combination of claim 1 including a chair having arm rests and sides, said arm rests extending laterally beyond said sides, said chair being fitted into said first section and supported thereon by engagement of said arm rests with the arms, respectively, of said first section.

4. In combination with a tricycle having a bar-like frame upon which a seat is mounted, said frame extending between the front and rear ends of said tricycle, the mounting for said seat including a post which passes through companion openings in said frame and a set screw threaded into said frame and locking said post against movement; a vehicular accessory comprising a bar-like support having first and second U-shaped sections, each section having two arms and a cross-bar, said sections being disposed in side-by-side relation and opening in the same direction, a section connecting the ends of adjacent arms of said first and second sections, said second section being disposed at a lower level than said first section when the latter is horizontally aligned, a mounting bracket attached to the free end of said second section, said bracket having a semi-circular portion and a diametrically outwardly extending mounting lug on one end of the semi-circular portion, said lug being flat and pivotally connected to said free end, means for locking said bracket in adjusted position, said bracket extending in a direction transverse to the arm carrying said free end, said semi-circular portion having two holes which are spaced apart in a direction parallel to said lug, said semi-circular portion partially surrounding the frame of said tricycle, and said post passing through said two holes as well as the companion openings, thereby mounting said bracket and said bar-like support on said frame, said lug depending from said frame and said bar-like support extending laterally therefrom in the form of a cantilever, said first section generally defining a plane which is horizontal and said second section generally defining an inclined plane wherein the cross-bar thereof is lowermost and rearward on the tricycle from said bracket, said first section being laterally spaced from said tricycle seat post a predetermined distance to accommodate without interference the leg of a rider on the tricycle.

5. In combination with a vehicle having a bar-like frame upon which a seat is mounted, said frame extending between the front and rear ends of said vehicle, the mounting for said seat including a post which passes through companion openings in said frame and a set screw threaded into said frame and locking said post against movement; a vehicular accessory comprising a bar-like support having first and second U-shaped sections, each section having two arms and a cross-bar, said sections being disposed in side-by-side relation and opening in the same direction, a section connecting the ends of adjacent arms of said first and second sections, a mounting bracket attached to the free end of said second section, said bracket having an embracing portion provided with opposite sides and a mounting lug, said lug being pivotally connected to said free end, means for locking said bracket in adjusted position, said bracket extending in a direction transverse to the arm carrying said free end, said embracing portion having two holes which are spaced apart in a direction parallel to said lug, said embracing portion partially surrounding the frame of said tricycle, and said post passing through said two holes as well as the companion openings, thereby mounting said bracket and said bar-like support on said frame, said lug depending from said frame and said bar-like support extending laterally therefrom in the form of a cantilever, said first section generally defining a plane which is horizontal and said second section generally defining an inclined plane wherein the cross-bar thereof is lowermost.

6. A vehicular accessory comprising a bar-like support having first and second U-shaped sections, each section having two arms and a cross-bar, said sections being disposed in side-by-side relation and opening in the same direction, a section connecting the ends of adjacent arms of said first and second sections, said second section being disposed below said first section when the latter is horizontally aligned, a mounting bracket attached to the free end of said second section, said bracket having a semi-circular portion and a diametrically outwardly extending mounting lug on one end of the semi-circular portion, said lug being flat and pivotally connected to said free end, means for locking said bracket in adjusted position, said bracket extending in a direction transverse to the arm carrying said free end, said semi-circular portion having two holes which are spaced apart in a direction parallel to said lug.

7. In combination with a vehicle having a bar-like frame upon which a seat is mounted, said frame extending between the front and rear ends of said vehicle, the mounting for said seat including a post which passes through companion openings in said frame and a set screw threaded into said frame and locking said post against movement, a vehicular accessory comprising a bar-like support having first and second U-shaped sections, each section having two arms and a cross-bar, said sections being disposed in side-by-side relation and opening in the same direction, a section connecting the ends of adjacent arms of said first and second sections, means engaged with said post for mounting said bar-like support on said frame.

8. In combination with a vehicle having a bar-like frame, a seat post secured transversely to said frame, a seat on said post; a cantilever rod-like support having opposite ends, one of said ends being mounted on said frame, means engageable with said post for holding said support in a substantially horizontal position, an object carrier, and means for detachably mounting said carrier on said support in spaced relation with said frame.

9. The combination of claim 8 wherein said vehicle is a tricycle, and said support includes a section which positions said carrier laterally beyond the space normally occupied by the legs of an operator while operating the tricycle, said section partially circumscribing and having a clearance with said space thereby avoiding interference with said operator's legs.

10. The combination of claim 8 wherein said vehicle is a tricycle, and said support includes a section which positions said carrier laterally beyond the space normally occupied by the legs of an operator while operating the tricycle, said section partially circumscribing and having a clearance with said space thereby avoiding interference with said operator's legs, said section being U-shaped with the arms thereof extending rearwardly of the tricycle and the cross-bar thereof being to the rear of said space.

11. A bracket for mounting an accessory on a vehicle having a bar-like frame and a seat post which penetrates said frame, comprising a semi-cylindrical element of rigid material, a flat lug integral with and projecting diametrically away from one end of said element, and said element having two holes which are spaced apart in a direction substantially parallel to said lug, whereby said element may straddle said frame and said holes may receive said post therethrough for mounting said bracket on said frame.

12. In combination with the bracket of claim 11, a support having a pivotal connection with said lug, and means for locking said support in adjusted pivoted position to said lug.

References Cited by the Examiner

UNITED STATES PATENTS

| | | | |
|---|---|---|---|
| 1,474,577 | 11/1923 | Bobbitt | 297—243 X |
| 1,624,915 | 4/1927 | Bennie | 280—203 |
| 2,630,334 | 3/1953 | Ewers | 280—289 |
| 2,672,351 | 3/1954 | Kane | 280—289 |
| 3,005,614 | 10/1961 | Daniell | 248—230 |
| 3,052,500 | 9/1962 | Hyde | 297—130 |
| 3,155,425 | 11/1964 | Chreist | 297—131 |

FOREIGN PATENTS 164,339   10/1949   Austria.

KENNETH H. BETTS, *Primary Examiner.*